(12) United States Patent
Kelekar et al.

(10) Patent No.: US 9,164,517 B2
(45) Date of Patent: Oct. 20, 2015

(54) MAINTAINING FLOW RATE OF A FLUID (75) Inventors: Rajesh Kelekar, Los Altos, CA (US);
Gaurav Verma, Sunnyvale, CA (US);
Kurt Weiner, San Jose, CA (US)

(73) Assignee: Intermolecular, Inc., San Jose, CA (US)

( * ) Notice: Subject to any disclaimer, the term of this patent is extended or adjusted under 35 U.S.C. 154(b) by 705 days.

(21) Appl. No.: 13/214,426

(22) Filed: Aug. 22, 2011

(65) Prior Publication Data
US 2011/0303696 A1 Dec. 15, 2011

Related U.S. Application Data (62) Division of application No. 11/965,442, filed on Dec. 27, 2007, now Pat. No. 8,037,894.

(51) Int. Cl.
*G05D 16/00* (2006.01)
*G05D 7/06* (2006.01)
*B01J 19/00* (2006.01)

(52) U.S. Cl.
CPC ........... *G05D 7/0635* (2013.01); *B01J 19/0046* (2013.01); *B01J 2219/0072* (2013.01); *B01J 2219/00286* (2013.01); *B01J 2219/00306* (2013.01); *B01J 2219/00337* (2013.01); *B01J 2219/00389* (2013.01); *B01J 2219/00418* (2013.01); *B01J 2219/00479* (2013.01); *B01J 2219/00585* (2013.01); *B01J 2219/00698* (2013.01); *B01J 2219/00756* (2013.01); *Y10T 137/0379* (2015.04); *Y10T 137/3115* (2015.04); *Y10T 137/3127* (2015.04); *Y10T 137/4807* (2015.04)

(58) Field of Classification Search
CPC .................................................... G05D 7/0635
USPC .................................. 422/112, 82.13; 506/33
See application file for complete search history.

(56) References Cited

U.S. PATENT DOCUMENTS

| | | | | |
|---|---|---|---|---|
| 3,557,077 A | * | 1/1971 | Brunfeldt | 530/334 |
| 2002/0048536 A1 | * | 4/2002 | Bergh et al. | 422/130 |
| 2003/0037836 A1 | * | 2/2003 | Blatt et al. | 141/21 |

* cited by examiner

*Primary Examiner* — Natalia Levkovich (57) ABSTRACT

A pressure gauge may be coupled to a supply line which carries liquid from a bottle to either one or more mixing vessels and/or one or more reactors in a combinatorial processing tool. A control device may monitor the pressure measured by the pressure gauge, and the control device may be configured to change the pressure supplied to the bottle based on a comparison of the measured pressure to a predetermined pressure value. The control device may adjust the pressure provided to the bottle using a pressure regulator coupled to the pressure source. By changing the pressure provided to the bottle, the control device may maintain a relatively constant flow rate of fluids from the liquid source into one or more mixing vessels and/or the one or more reactors.

12 Claims, 5 Drawing Sheets

MAINTAINING FLOW RATE OF A FLUID

CROSS-REFERENCE TO RELATED APPLICATION

This application is a divisional application and claims priority to U.S. application Ser. No. 11/965,442 filed on Dec. 27, 2007, with a Notice of Allowance on Jul. 12, 2011.

GOVERNMENT RIGHTS IN THIS INVENTION

This invention was made with U.S. government support under contract number H94003-07-C-0712. The U.S. government has certain rights in this invention.

FIELD OF THE INVENTION

Implementations of various technologies described herein generally relate to substrate processing.

DESCRIPTION OF THE RELATED ART

The following descriptions and examples do not constitute an admission as prior art by virtue of their inclusion within this section.

To achieve the desired performance enhancement for each successive generation of silicon integrated circuits (ICs), semiconductor manufacturing has become increasingly reliant on new materials and their integration into advanced process sequences. Unfortunately, typical semiconductor manufacturing equipment is not well suited for materials exploration and integration. Issues impacting the use of typical semiconductor manufacturing equipment include difficulty in changing process materials and chemicals rapidly, limited ability to integrate and sequence multiple materials or chemicals in a single reactor or process chamber, high equipment cost, large sample size (300 mm wafer) and inflexible process/reactor configurations. To complement traditional manufacturing tools, a need has arisen for process equipment that facilitates fast testing of new materials and materials processing sequences over a wide range of process conditions.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The following paragraphs generally describe one or more implementations of various technologies and techniques directed to maintaining a relatively constant flow rate of a fluid in a combinatorial processing tool. In one implementation, the fluid may be a liquid chemical used in the combinatorial processing tool. A pressurized gas source may be coupled to a bottle containing the fluid, and the gas source may provide a pressure to the fluid in the bottle sufficient to push the fluid out of the bottle and through a supply line. The supply line may be coupled to a supply manifold which may be configured to supply the liquid to one or more vessels and/or one or more reactors within the combinatorial processing tool.

If the pressure supplied by the pressure source is constant, variations in the state of the combinatorial processing tool, such as variations in the number of vessels to which the liquid is supplied, may result in a variation of the fluid flow rate within the combinatorial processing tool. Accordingly, implementations of various techniques described herein may be used to maintain a relatively constant flow rate of the fluid regardless of the state of the combinatorial processing tool.

Parts of the tool (e.g., flow cells) may be occasionally calibrated to flow fluids at a specific rate. Monitoring a pressure within the tool and adjusting the pressure applied to fluids within a source chemical bottle based on the monitored pressure maintains the flow rate calibration of the tool. Maintaining the flow rate calibration of the tool also improves combinatorial processing across multiple regions, in that the flow in the multiple regions may be more predictable.

Additionally, the tool may have varying flow demands (e.g., if different numbers of flow cells are operating). For example, an increase in fluid flow demand on the source chemical bottle can reduce the level of the chemical bottle more quickly or the additional resistance in the multiple lines may require adjustments. Various techniques described herein may be used to increase the pressure in the bottle and therefore can be used to compensate for the increased fluid flow demand.

In one implementation, a relatively constant fluid flow rate may be achieved by monitoring the pressure within the supply line and varying the pressure supplied to the bottle in response to changes in the pressure within the supply line.

One or more implementations of various techniques for maintaining a relatively constant fluid flow rate will now be described in more detail with reference to FIGS. 1-4 in the following paragraphs.

The discussion below is directed to certain specific implementations. It is to be understood that the discussion below is only for the purpose of enabling a person with ordinary skill in the art to make and use any subject matter defined now or later by the patent "claims" found in any issued patent herein.

Combinatorial processing may include any processing, including semiconductor processing, which varies the processing conditions across one or more substrates. As used herein, a substrate may be, for example, a semiconductor wafer, a portion of a semiconductor wafer, solar photovoltaic circuitry, or other semiconductor substrate. The term "substrate" includes a coupon, which is a diced portion of a wafer, or any other device on which semiconductor processes are performed. The coupon or substrate may optionally contain one die, multiple dice (connected or not through the scribe), or portion of die with useable test structures. In some implementations, multiple coupons, or die can be diced from a single wafer and processed combinatorially.

Combinatorial processing is performed by varying processing conditions across multiple substrates, multiple regions of a single substrate, or a combination of the two. Processing conditions may include, for example, chemical formulation, fluid flow rates, temperatures, reaction times, concentrations, agitation or stirring, and the like. For example, a first region of a substrate may be processed using a first process condition (e.g., applying a chemical at a first temperature) and a second region of the substrate may be processed using a second process condition (e.g., applying the chemical at a second temperature). The results (e.g., the measured characteristics of the processed regions) are evaluated, and none, one, or both of the process conditions may be selected as suitable candidates for larger scale processing (e.g., further combinatorial processing or deposition on a full wafer). Techniques for combinatorial processing are described in U.S. patent application Ser. No. 11/352,077, entitled "Methods For Discretized Processing and Process Sequence Integration of Regions of a Substrate," which is incorporated herein by reference.

Several combinatorial processing tools can be used. One type of tool may include a reactor block that has several openings (e.g., cylindrical openings) that define individual reactors on a single substrate. Each of the openings may further include a sleeve that creates a seal with the substrate to contain processing fluids or chemicals within a single reactor. For example, a reactor block may include 28 openings that define 28 regions on a substrate. Each of the 28 regions can be processed using varying process conditions, or multiple regions can have the same processing conditions. For example, seven sets of processing conditions can be performed across four regions each. Each region can then be characterized using various techniques (e.g., electrical test, microscopy), and useful or beneficial techniques and/or conditions can be selected.

Other combinatorial processing may be performed in a manner that is not site isolated. For example, a wafer can be divided into many small coupons, each of which can be processed using different conditions. Using another example, a wafer can be processed using a gradient approach, where the processing varies over the substrate.

Figure 1A:
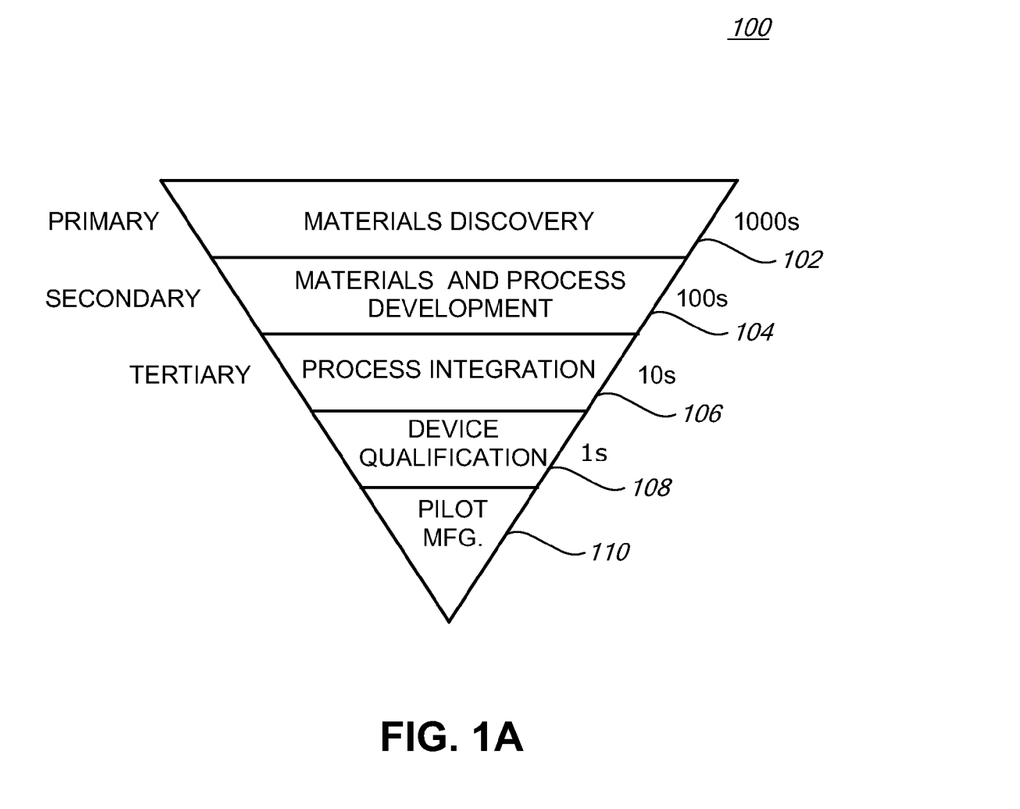
FIG. 1A illustrates a schematic diagram for implementing combinatorial processing in connection with implementations of various technologies described herein.

FIG. 1A illustrates a schematic diagram 100 for implementing combinatorial processing in connection with implementations of one or more technologies described herein. The schematic diagram 100 illustrates that the relative number of combinatorial processes that run with a group of substrates decreases as certain materials and/or processes are selected. Generally, combinatorial processing includes performing a large number of processes during a first screen, selecting promising candidates from those processes, performing the selected processing during a second screen, selecting promising candidates from the second screen, and so on. In addition, feedback from later stages to earlier stages can be used to refine the success criteria and provide better screening results.

For example, thousands of materials are evaluated during a materials discovery stage 102. Materials discovery stage 102 is also known as a primary screening stage performed using primary screening techniques. Primary screening techniques may include dividing wafers into coupons and depositing materials using varied processes. The materials are then evaluated, and promising candidates are advanced to the secondary screen, i.e., materials and process development stage 104. Evaluation of the materials may be performed using metrology tools such as electronic testers and imaging tools, e.g., microscopes.

The materials and process development stage 104 may evaluate hundreds of materials (i.e., a magnitude smaller than the primary stage) and may focus on the processes used to deposit or develop those materials. Promising materials and processes are again selected, and advanced to the tertiary screen or process integration stage 106, where tens of materials and/or processes and combinations are evaluated. The tertiary screen or process integration stage 106 may focus on integrating the selected processes and materials with other processes and materials.

The most promising materials and processes from the tertiary screen are advanced to device qualification stage 108. In device qualification, the materials and processes selected are evaluated for high volume manufacturing, which normally is conducted on full wafers within production tools, but need not be conducted in such a manner. The results are evaluated to determine the efficacy of the selected materials and processes. If successful, the use of the screened materials and processes can proceed to the manufacturing stage 110.

The schematic diagram 100 is an example of various techniques that may be used to evaluate and select materials and processes for the development of semiconductor devices. The descriptions of primary, secondary, etc. screening and the various stages 102-110 are arbitrary and the stages may overlap, occur out of sequence, be described and be performed in many other ways.

Figure 1B:
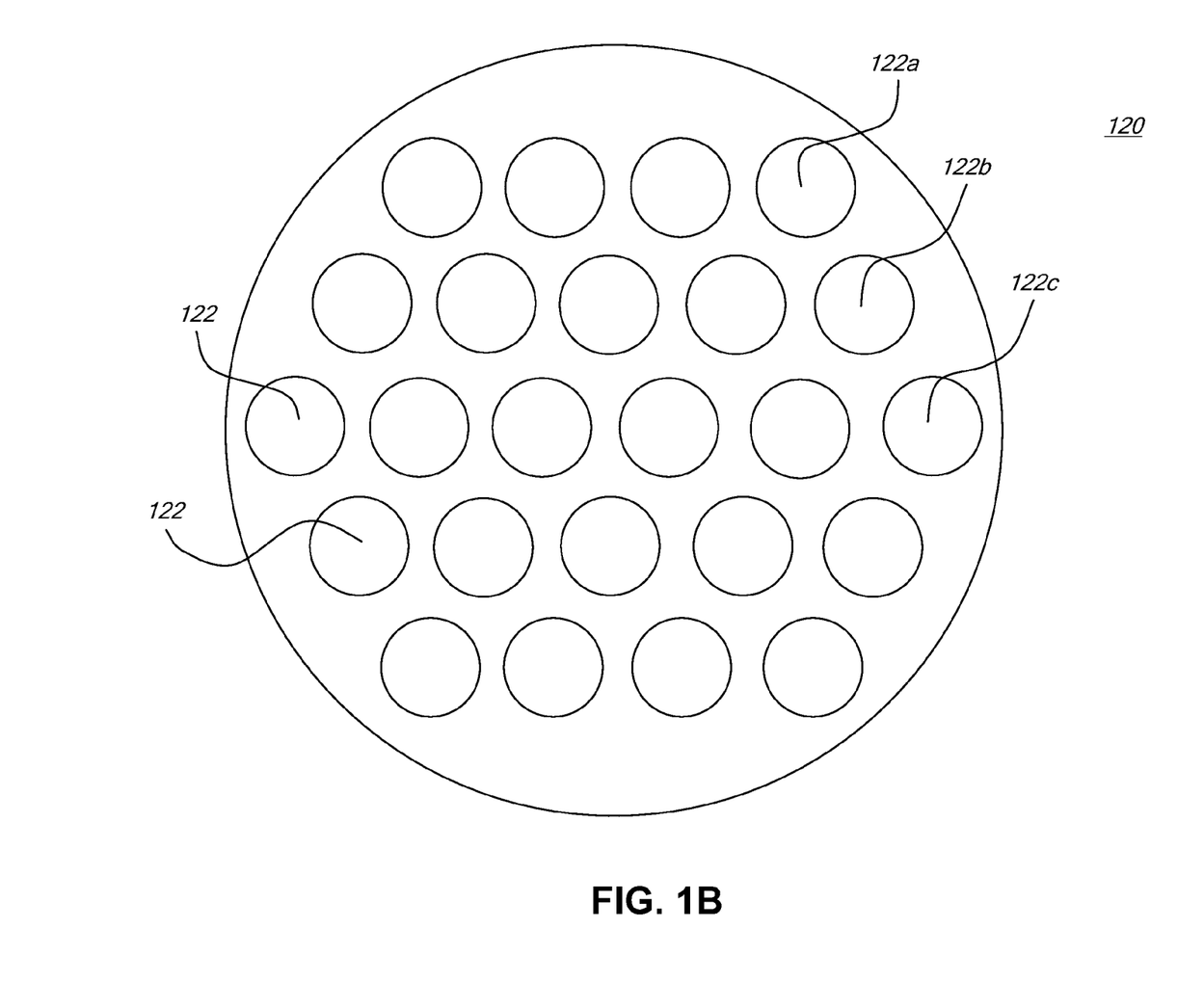
FIG. 1B illustrates an exemplary substrate containing multiple regions for combinatorial processing according to implementations of various technologies described herein.

FIG. 1B illustrates a substrate 120 having multiple regions for combinatorial processing in accordance with various techniques described herein. Substrate 120 includes several regions 122 on which semiconductor processes can be performed. For example, the regions 122a, 122b, and 122c may each have an electroless layer deposited on them. The region 122a may use a first chemical formulation, the region 122b may use a second chemical formulation, and the region 122c may use a third chemical formulation. The resulting layers can be compared to determine the relative efficacy of each of the formulations. None, one, or more of the formulations can then be selected to use with further combinatorial processing or larger scale processing (e.g., manufacturing). Any process variable (e.g., time, composition, temperature) or process sequencing can be varied using combinatorial processing.

As discussed above, each of the regions 122 may or may not be site isolated. Site isolation refers to a condition where the regions 122 can be processed individually and independently without interference from neighboring regions. For example, one or more of the regions 122 may include a sleeve having an end that forms a fluid seal with the substrate 120. The sleeve is configured to contain processing fluids (e.g., chemicals), and is made from a material (e.g. polytetrafluoroethylene (PTFE)) that does not react with the processing chemicals used. The chemicals do not leak out of the region into which they were dispensed, and each region 122 can be processed and evaluated individually.

Figure 2:
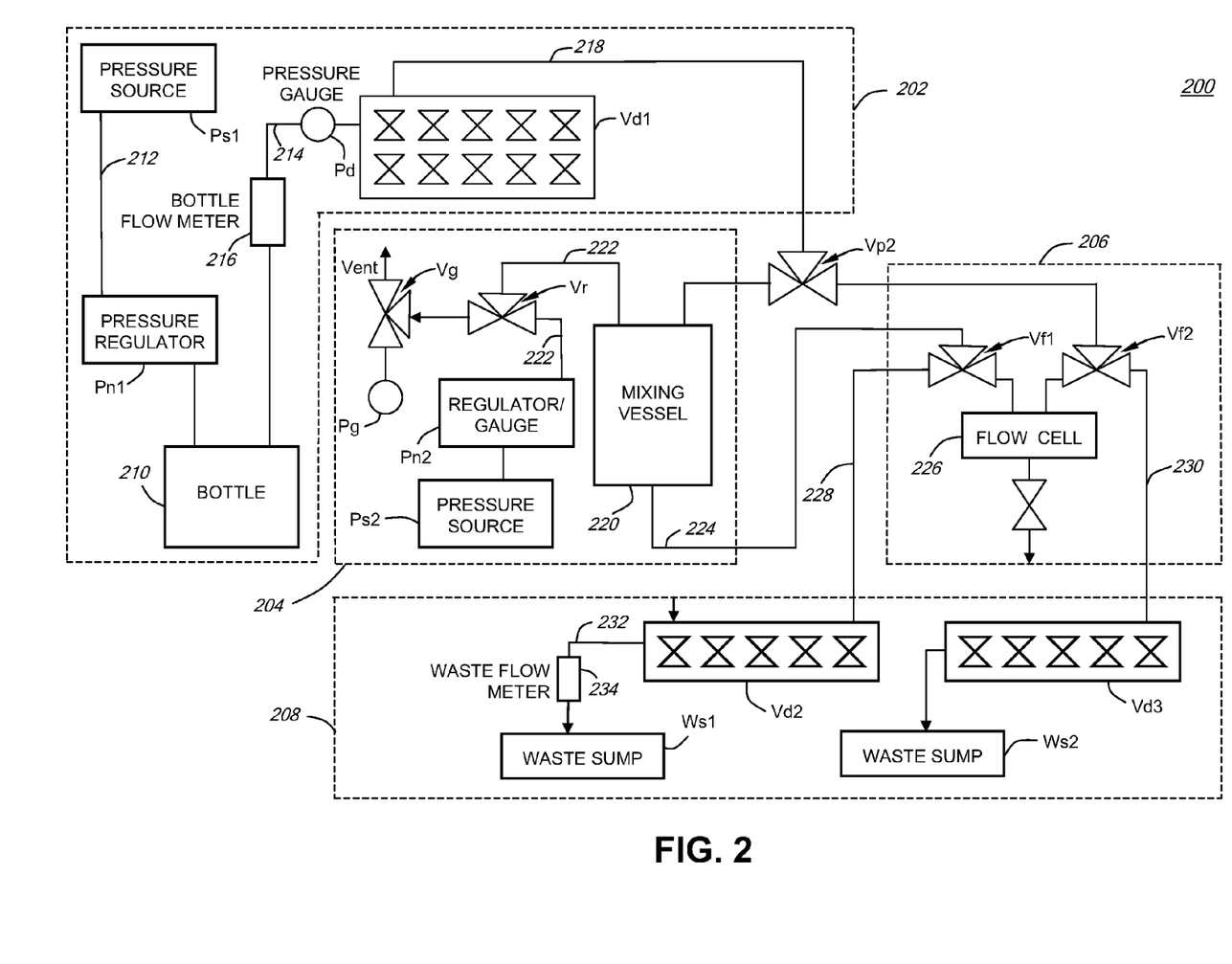
FIG. 2 illustrates a schematic diagram of a combinatorial processing tool according to implementations of various technologies described herein.

Each of the regions 122 may be processed using a cell of a combinatorial processing tool, as described in FIG. 2. The tool is calibrated so that processing in each of the regions 122 is consistent and comparable. Using techniques described herein, pressure within the combinatorial processing tool may be monitored and the pressure supplied to the chemical supply bottle can be adjusted so that the flow rate in the flow cells stays consistent and calibrated. With these techniques, processed regions across one or multiple substrates may show reliable results that can be compared and characterized when performing combinatorial processing.

Combinatorial Processing Tool

FIG. 2 illustrates a schematic diagram of a combinatorial processing tool 200 according to implementations of one or more technologies described herein. The combinatorial processing tool 200 illustrated in FIG. 2 may be a wet processing tool and may be a portion of a larger combinatorial processing tool. Portions of the combinatorial processing tool 200 may be replicated several times within a larger combinatorial processing tool such that a larger number of variations in substrate processing conditions may be achieved.

The combinatorial processing tool 200 illustrated in FIG. 2 may be divided into four parts. A chemical supply portion 202 may supply chemicals to a chemical mixing portion 204 and a site isolated reactor portion 206. The chemical mixing portion 204 may be used for mixing various chemicals, e.g., liquid chemicals, into solutions which may be applied to various locations on a substrate in the reactor portion 206. The reactor portion 206 may contain a site isolated reactor and may apply the solutions to the substrate or portions of the substrate and may subject the substrate or portions thereof to various processing conditions. The reactor portion 206 may be coupled to a waste portion 208 of the combinatorial processing tool 200. The waste portion 208 may be used to capture waste chemicals which were not used during substrate processing.

The supply portion 202 of the combinatorial processing tool 200 may include a bottle 210 containing a liquid chemical. The chemical may be applied to the substrate or may be mixed with another chemical to form a solution which is to be applied to the substrate. As illustrated in FIG. 2, a pressure source PS1 and a pressure regulator Pn1 may be coupled to the bottle 210 via a pressure supply line 212. Together the pressure source PS1 and the pressure regulator Pn1 may provide a pressurized gas, such as Nitrogen, at a regulated pressure to the bottle 210 via the supply line 212. In this manner, the pressurized gas may be used to push the liquid chemical out of the bottle 210 and into a line 214 connecting the bottle 210 to a supply manifold Vd1. A flow meter 216 and a pressure transducer Pd may be coupled to the line 214. The flow meter 216 may monitor the flow rate of liquids through the line 214 and the pressure gauge Pd may monitor the pressure within the line 214.

The supply manifold Vd1 may contain a plurality of two-way and/or multi way valves connecting the bottle 210 to a plurality of mixing cells/vessels within the combinatorial processing tool 200. Furthermore, in lieu of a single bottle 210, a plurality of bottles containing various chemicals may be coupled to the supply manifold Vd1 such that the supply manifold Vd1 may supply various chemicals to multiple mixing portions or multiple site isolated reactor portions of the combinatorial processing tool 200. Additionally, in lieu of a single supply manifold Vd1, a plurality of supply manifolds Vd1 may be present in the combinatorial processing tool 200. Together the plurality of bottles, valves, and supply manifolds may enable the supply of various chemicals and chemical mixtures to the mixing portion 204 and the site isolated reactor portion 206 of the combinatorial processing tool 200.

The line 214 coupling the bottle 210 to the supply manifold Vd1 may be coupled to a valve, e.g., a multi-way valve, within the supply manifold Vd1 such that the supply manifold Vd1 may control the flow of chemicals from the bottle 210 to the mixing portion 204 or the reactor portion 206 of the combinatorial processing tool 200.

The output of the valve in the supply manifold Vd1 may be coupled via a line 218 to a valve Vp2. The valve Vp2 may be a multi-way valve which controls the flow of fluids/chemicals from the supply manifold Vd1 into either the mixing portion 204, site-isolated reactor portion 206, or both.

The mixing portion 204 of the combinatorial processing tool 200 is provided to allow thorough solution mixing of chemicals provided by supply portions. In order to form a solution, a plurality of chemicals may flow from the supply portion 202, e.g., the bottle 210, into different mixing vessels in the mixing portion 204. The mixing vessel 220 may then mix the chemicals to form solutions. The mixing portion 204 may also provide accurate temperature and pH control of a solution being mixed in the mixing portion 204.

A pressure source Ps2 and a pressure regulator Pn2 may be coupled to the mixing vessel 220 via a valve Vr and a supply line 222. Together the pressure source PS2 and the pressure regulator Pn2 may provide a pressurized gas, e.g., Nitrogen, at a regulated pressure to the mixing vessel 220 via the valve Vr and the supply line 222. An outlet of the valve Vr may be coupled to another valve Vg to vent pressure within the supply line 222. The pressure in the supply line 222 may be measured by a pressure transducer Pg.

The pressurized gas provided by the pressure source Ps2 and the pressure regulator Pn2 may push the mixed chemicals in the mixing vessel 220 through a line 224 and into the site-isolated reactor portion 206 of the combinatorial processing tool 200. The mixed chemicals may flow through a valve Vf1 and into a flow cell 226. The flow cell 226 may be one portion of a site isolated reactor, and may be used to apply the mixed chemicals to a portion or portions of a substrate under processing in the site-isolated reactor portion 206 of the combinatorial processing tool 200. The flow cell 226 may be one of a series of parallel cells forming site-isolated reactors which may be configured to effect site-isolated processing on proximate regions on the substrate. Each of the flow cells may be configured to effect site isolated processing, for example, by flowing fluids (e.g., mixed chemicals) onto proximate regions on the substrate. Chemicals may be provided to the flow cell 226 and, consequently, to a substrate via the supply manifold Vd1.

A rate of fluid flow into the flow cell 226 may be calibrated before the tool 200 is used so that the combinatorial processing of the tool 200 is reliable and so that the multiple regions (e.g., regions 122) of a substrate can be compared. The techniques described herein monitor pressure within a supply line of the combinatorial processing tool 200 and adjust pressure in the bottle 210 to maintain a constant fluid flow rate into the flow cell 226. The flow rate out of the bottle changes with changes in pressure. Thus, maintaining a consistent pressure within a supply line of the combinatorial processing tool 200 can be used to maintain fluid flow rate calibration of the tool 200.

In some implementations, different numbers of flow cells 226 may be operating simultaneously. For example, during one operation only one flow cell may be open, while during another, eight may be open. The variability of the number of flow cells in operation changes the flow volume demands. Using the techniques described herein, the pressure in the bottle 210 can be adjusted during changes in the number of flow cells operating within the combinatorial processing tool 200 to maintain fluid flow rate calibration and consistent processing across multiple regions.

After exposing the substrate to the desired amount of chemicals, unused chemicals may exit the flow cell 226 through valve Vf1 and waste line 228 or through valve Vf2 and waste line 230. Waste line 228 may be coupled to a waste manifold Vd2, and waste line 230 may be coupled to waste manifold Vd3. The waste manifolds may be coupled to waste sumps (e.g., waste sump Ws1 and waste sump Ws2) and the waste manifolds may be used to divert chemicals into specific waste sumps. A waste line 232 may couple a waste manifold Vd2 to a waste sump Ws1. Furthermore, a waste flow meter 234 may be coupled to the waste line 232 to measure a flow rate of waste liquids flowing into the waste sump Ws1.

The flow meters (e.g., flow meter 216 and flow meter 234) may be any type of flow meter available. For example, the flow meters may be ultrasonic flow meters which measure the travel time of ultrasonic waves through a liquid and calculates a flow rate of the liquid based on the measured travel time of the ultrasonic waves. The flow meters may also be magnetic flow meters which measure changes in a magnetic field applied to a liquid to determine a rate of liquid flow.

Maintaining a Relatively Constant Fluid Flow Rate of a Fluid

As described above, the supply portion 202 of the combinatorial processing tool 200 may supply fluids (e.g., liquid chemicals) to the mixing portion 204 and the reactor portion 206 of the combinatorial processing tool 200. For example, the bottle 210 may supply a fluid via the supply line 214 and the supply manifold Vd1 to the mixing portion 204 and the reactor portion 206 of the combinatorial processing tool 200.

In combinatorial processing tools, in order to reliably and consistently process multiple regions of a substrate, it may be desirable to maintain a relatively constant fluid flow rate into the mixing portion 204 and/or the reactor portion 206 of the combinatorial processing tool. However, in some circumstances the flow rate of the fluid may be affected by the state of the combinatorial processing tool. For example, if the pressure applied to the bottle 210 by the pressure source Ps1 is constant and a valve in the supply manifold Vd1 is opened to couple the supply line to a single flow cell 226, the flow rate out of the bottle 210 may be a first value. However, if more valves in the supply manifold Vd1 are opened to supply fluids from the bottle 210 to multiple flow cells, the flow rate within the flow cells may be a different value than the first value. Additionally, if the pressure applied to the bottle 210 by the pressure source Ps1 is constant, the flow rate within the flow cells may also change or vary based on the height of the liquid in the bottle 210.

Consequently, a need exists for maintaining a relatively constant flow rate within the flow cells regardless of the state of the combinatorial processing system (e.g., number of vessels into which the fluid is flowing, height of liquid in the bottle, etc.).

Implementations described herein provide technologies and devices for maintaining a relatively constant fluid flow rate into destination vessels (e.g., mixing vessels and/or flow cells). According to one implementation, a relatively constant fluid flow rate may be maintained by monitoring a pressure in a supply line coupled to the bottle containing the liquid and varying the pressure provided to the bottle based on the monitored pressure.

Figure 3:
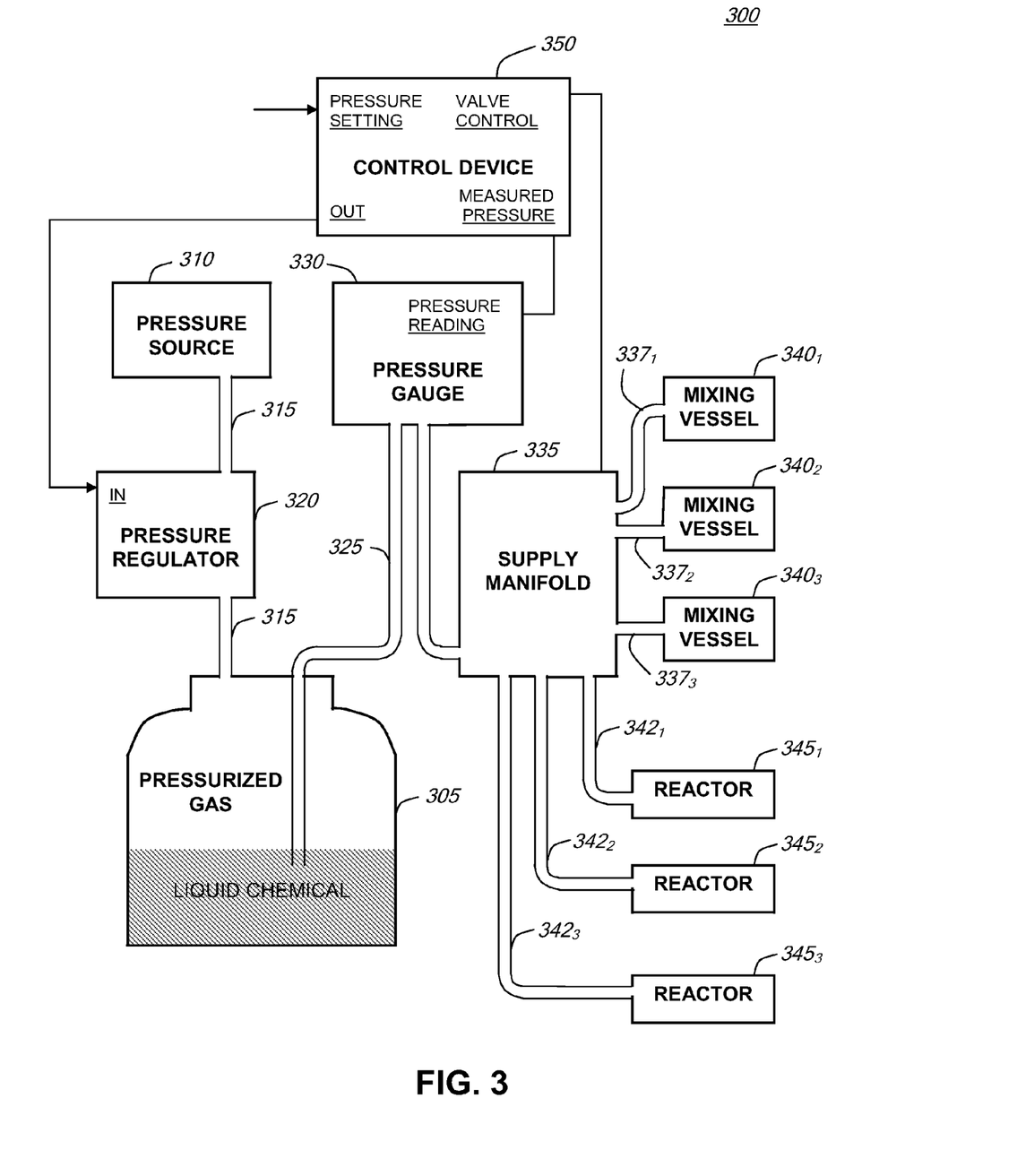
FIG. 3 illustrates a system for maintaining a relatively constant flow rate of a fluid according to implementations of various technologies described herein.

FIG. 3 illustrates a system 300 which maintains a relatively constant flow rate of fluids according to implementations of various technologies described herein. The system 300 includes a bottle 305 which contains a fluid (e.g., a liquid chemical). A pressurized gas may be supplied to the bottle 305 via a pressure source 310. The pressure source 310 may supply the pressurized gas to the bottle 305 through a gas supply line 315. A pressure regulator 320 may be coupled to the gas supply line 315 and may be configured to regulate an amount of pressurized gas provided to the bottle 305 from the pressure source 310.

As illustrated in FIG. 3, a liquid supply line 325 may be coupled to or inserted into the bottle 325 such that a first end of the supply line 325 is immersed into the liquid chemical within the bottle 305. A second end of supply line 325 may be coupled to a supply manifold 335.

The supply manifold 335 may contain a plurality of valves. The inputs of the valves within the supply manifold 335 may be coupled, via supply lines, to a plurality of bottles containing chemicals (e.g., bottle 305). The outputs of the valves within the supply manifold 335 may be coupled to a plurality of mixing vessels 3401-3 via secondary supply lines 3371-3. Furthermore, the outputs of the valves within the supply manifold 335 may be coupled to a plurality of reactors 3451-3 via secondary supply lines 3421-3. Consequently, the mixing vessels 3401-3 and reactors 3451-3 may be configured to receive the fluids from the plurality of bottles via the secondary supply lines 3371-3 and 3421-3. Additionally, in some implementations, outputs (not shown) of the mixing vessels 340 may provide mixed chemicals to the reactors 345, as is further described regarding FIG. 2.

If varying numbers of mixing vessels 340 and reactors 345 are being supplied with chemicals, the flow volume demands from the bottle 305 may change. In order to maintain calibrated fluid flow rate through the secondary supply lines 3371-3 and 3421-3 and into the mixing vessels 340 and reactors 345 so that multiple regions of a substrate can be reliably and consistently processed, the pressure of the bottle 305 may be varied using the pressure regulator 320. For example, during one operation fluid may flow into all three mixing vessels 340 and into all three reactors 345. In a subsequent operation, fluid may flow into only one of the reactors 345. During this change, the pressure in the line 325 may change, necessitating a change in the pressure supplied to the bottle 305 to maintain fluid flow rate through the secondary supply lines 3371-3 and 3421-3 and into the mixing vessels 340 and reactors 345.

According to one implementation, a pressure gauge 330 may be coupled to the supply line 325 such that the pressure gauge 330 measures a pressure within the supply line 325. The pressure gauge 330 may be any type of pressure gauge or pressure transducer. For example, the pressure gauge 330 may be a fluoro-polymer based pressure transducer.

The pressure gauge 330 may be coupled to the supply line 325 closer to the supply manifold 335 than to the bottle 305. According to one implementation, the pressure gauge 330 may be located as close to the supply manifold 335 as possible. The pressure gauge 330 may be located as close to the supply manifold 335 as possible such that there is a minimum pressure drop between the pressure gauge 330 and the supply manifold 335. The lower the pressure drop between the pressure gauge 335 and the supply manifold 335, the more accurately the system 300 illustrated in FIG. 3 may maintain a relatively constant fluid flow rate into the mixing vessels 340 and reactors 345 regardless of the state of the combinatorial processing system.

The pressure gauge 330 may supply a pressure reading indicative of the pressure within the supply line 325 to an input of a control device 350. The control device 350 may be, for example, a computer system containing one or more processors, memory (e.g., hard disk drive(s), random access memory, etc.), devices for receiving input from a user (e.g., keyboard, mouse, etc.), communication devices (e.g., network controllers, serial ports, etc.), and/or devices for outputting data (e.g., printers, monitors, data storage, etc.).

The control device 350 may be configured to receive as input a recipe for processing a substrate or substrates within the combinatorial processing tool 200. A recipe may be a set of parameters that may be specified by a user, for example, for performing the combinatorial processing. A recipe may include such parameters as chemical types, flow rates, concentrations, sequences, reaction times, bottle pressures, etc.

The control device 350 may have a second input configured to receive a predetermined pressure setting. The pre-determined pressure setting may correspond to a desired flow rate of the fluid through the combinatorial processing tool. The pressure setting may be specified using a recipe. Alternatively, the pressure setting can be determined by a set of instructions used to calculate the pressure setting based on other parameters (e.g., desired flow rates) or measured characteristics.

An output of the control device 350 may be coupled to the supply manifold 335 and may be configured to control the opening and closing of valves within the supply manifold 335. Additionally, the control device 350 may also have an output (Out) coupled to the pressure regulator 320.

As will be described further below with respect to FIG. 4, the control device 350 may be configured to compare the pressure reading from the pressure gauge 330 to the pressure setting. Based on the results of the comparison, the control device 350 may be configured to modify the amount of pressure supplied to the bottle 305 by adjusting the pressure regulator 320.

The system 300 illustrated in FIG. 3 may be a portion of, or used in combination with, the combinatorial processing tool 200 illustrated in FIG. 2 in order to maintain a relatively constant flow rate of fluid into mixing vessels and flow cells within the combinatorial processing tool 200. For example, the pressure source 310, pressure regulator 320, bottle 305, supply manifold 335, mixing vessels 3401-3, and reactors 3451-3 illustrated in FIG. 3 may be the same as the pressure source PS1, pressure regulator Pn1, bottle 210, supply manifold Vd1, mixing vessel 220, and flow cell 225 illustrated in FIG. 2, respectively.

Figure 4:
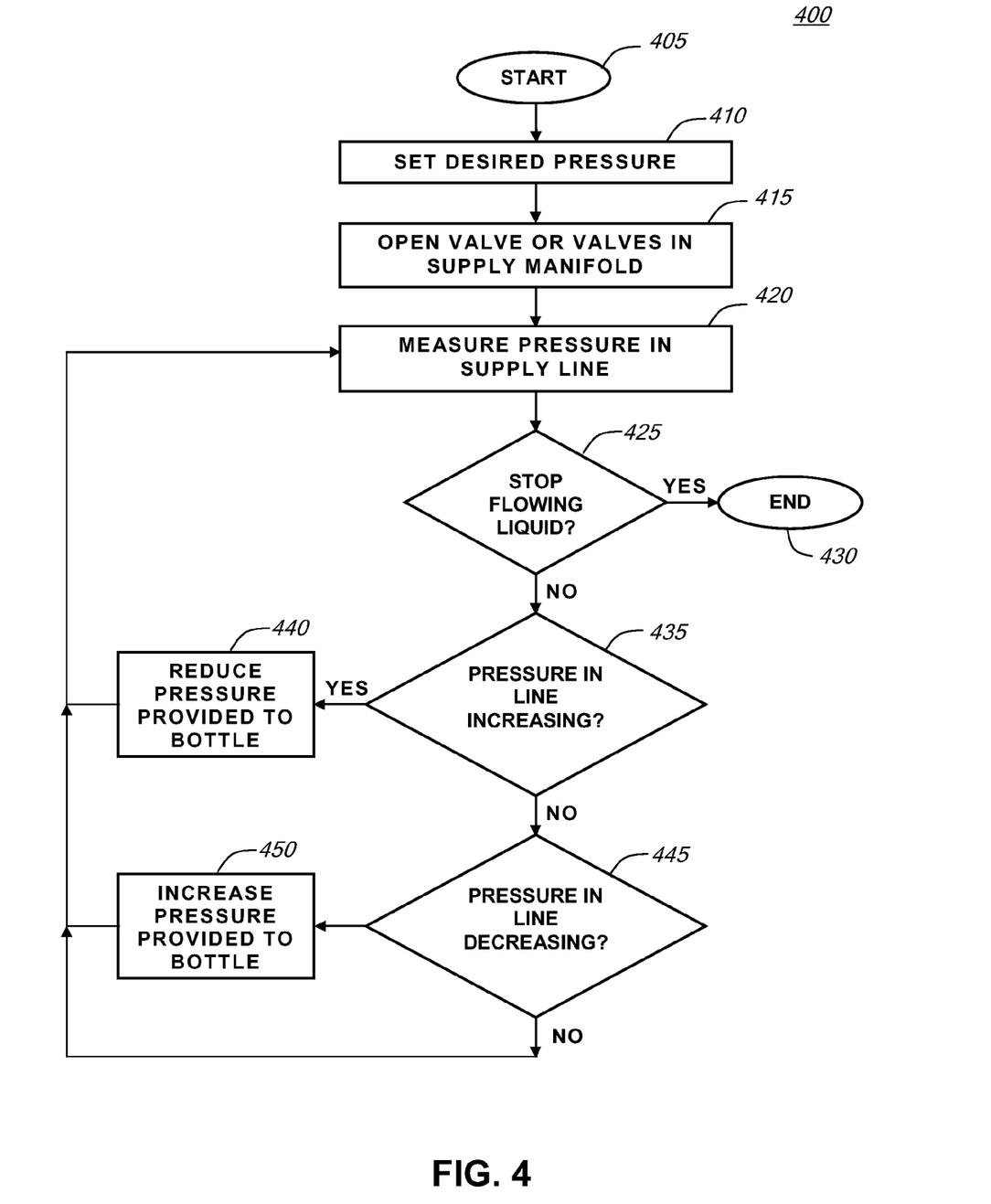
FIG. 4 is a flow diagram illustrating a method for maintaining a relatively constant flow rate of a fluid according to implementations of various techniques described herein.

FIG. 4 illustrates a method 400 for maintaining a relatively constant fluid flow rate using the system 300 illustrated in FIG. 3 in accordance with implementations of various techniques described herein. Method 400 may be executed by the control device 350 illustrated in FIG. 3.

In one implementation, method 400 may begin at step 405 when use of the combinatorial processing tool is commenced. At step 410, a user of the combinatorial processing tool may indicate a desired pressure setting in the control device 350. The control device 350 may use this desired pressure set point to adjust the pressure regulator 320. The pressure setting may be a single pressure value, and the control device may attempt to keep a pressure in the supply line 325 close to the desired pressure setting in order to maintain a relatively constant fluid flow rate. Alternatively, the pressure setting may be a range including a high pressure threshold value and a low pressure threshold value. If the pressure setting is a range of values, the control device 350 may attempt to keep the pressure in the supply line 325 less than the high pressure threshold value and greater than the low pressure threshold value in order to maintain a relatively constant flow rate of fluids.

After a user has set the desired pressure setting, the control device 350 may adjust the pressure regulator 320 according to the pressure setting. This may cause pressure to be provided to the bottle 305 via the pressure source 310 and the supply line 315.

At step 415, the control device 350 may open a valve or valves in the supply manifold 335 which is/are coupled to the fluid supply line 325. Opening the valves in the supply manifold 335 may cause the pressure supplied to the bottle 305 to push the fluid in the bottle 305 into the supply line 325 and out of the bottle 305. The fluid may flow through the supply line 325, through the supply manifold 335, through the secondary supply lines 3371-3 and 3421-3 and into one or more mixing vessels 3401-3 and/or one or more reactors 3451-3. The liquid chemical which flows into the reactor portion 206 of the combinatorial processing tool 200 may flow across one or more regions of a substrate undergoing combinatorial processing.

As the fluid flows through the supply line 325 and the supply manifold 335, at step 420 the pressure gauge 330 may measure the pressure within the supply line 325 and provide a pressure measurement to the control device 350. Next, at step 425 the control device 350 may determine if the flow of the liquid should be stopped. The flow of liquid may need to be stopped, for example, if the desired amount of chemical has flowed into the mixing vessel(s) and/or reactor(s). If the control device 350 determines that the flow of the liquid should be stopped, the control device 350 may turn off the valve or valves coupled to the supply line 325 thereby stopping the flow of the fluid and ending method 400 at step 430.

However, if the control device 350 determines that the flow of fluids should continue, the control device 350 may proceed to step 435 to determine if the measured pressure in the supply line 325 is increasing. As described above, the pressure in the supply line 325 may change (e.g., increase) depending on the state of the combinatorial processing tool. For example, the pressure in the supply line 325 may increase or decrease if the number of mixing vessels or reactors to which the fluid is being flowed into decreased or increased, respectively.

The control device 350 may determine if the pressure in the supply line 325 is increasing by comparing the pressure measurement from the pressure gauge 330 to the pressure setting. If the measured pressure in the supply line 325 is greater than the pressure setting or greater than a high threshold of a pressure setting range, then it the pressure in the supply line 325 may be determined as increasing. Increases and decreases in pressure can also be compared to prior measurements in a trend line fashion with no adjustments being made as long as the flow is within the threshold range.

If the pressure in the supply line 325 is increasing, the control device 350 may reduce or decrease the amount of pressure supplied to the bottle 305 from the pressure source 310 (step 440). The control device 350 may increase the amount of pressure supplied to the bottle 305 by adjusting the pressure regulator 320. By reducing the pressure supplied to the bottle 305, the pressure in the supply line 325 may be reduced and, as a consequence, a relatively constant flow rate of the fluid through the secondary supply lines 3371-3 and 3421-3 and into the mixing vessel(s) and/or reactor(s) may be maintained. After reducing the pressure supplied to the bottle 305, the control device may return to step 420 to again measure the pressure in the supply line 325.

However, if at step 435 the control device 350 determines that the pressure in the supply line 325 is not increasing, the control device 350 may proceed to step 445 to determine if the pressure within the supply line 325 is decreasing. The control device 350 may determine if the pressure in the supply line 325 is decreasing by comparing the pressure measurement from the pressure gauge 330 to the pressure setting. If the measured pressure in the supply line 325 is less than the pressure setting or less than a low threshold of a pressure setting range, the pressure in the supply line 325 may be decreasing.

If the pressure in the supply line 325 is decreasing, the control device 350 may proceed to step 450 to increase the amount of pressure supplied to the bottle 305 from the pressure source 310. The control device may increase the amount of pressure supplied to the bottle 305 by adjusting the pressure regulator 320. By increasing the pressure supplied to the bottle 305, the pressure in the supply line 325 may be increased and, as a consequence, the flow rate of the fluid through the secondary supply lines 3371-3 and 3421-3 and into the mixing vessels 340 and reactors 345 may be maintained. After increasing the pressure supplied to the bottle 305, the control device may return to step 420 to again measure of the pressure in the supply line 435.

If at step 445 the control device 350 determines that the pressure in the supply line 325 is not decreasing, the pressure within the supply line 325 has not changed and consequently the fluid flow rate is relatively constant. Consequently, the control device 350 does not need to modify the amount of pressure supplied to the bottle 305 and, thus, the control device 350 may return to step 420 to again measure the pressure in the supply line 325.

By increasing or decreasing pressure supplied to the bottle 305 based on the pressure in the supply line 325, implementations described herein provide systems and technologies for maintaining a relatively constant flow rate of fluids in a combinatorial processing tool.

In one implementation, the pressure setting or the pressure setting range in the control device 350 may be periodically varied or modified. Modifications in the pressure setting or the pressure setting range may result in a new fluid flow rate in the combinatorial processing system. The system 300 illustrated in FIG. 3 and the method 400 illustrated in FIG. 4 may then maintain the new fluid flow rate within the system. The pressure setting or pressure setting range may be modified according to a recipe or calculated value, for example.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A wet processing tool configured to process multiple regions of a substrate combinatorially, comprising:
    a vessel configured to hold a semiconductor processing liquid;
    a pressurized gas source in fluid communication with the vessel;
    a pressure regulator in fluid communication with the vessel and the pressurized gas source, the pressure regulator configured to regulate a pressure of pressurized gas provided from the pressurized gas source to the vessel;
    a first supply line in fluid communication with the vessel;
    a pressure sensing device in fluid communication with the first supply line, wherein the pressure sensing device is configured to detect a pressure of processing liquid flowing from the vessel through the first supply line and generate a signal representative thereof;
    a supply manifold in fluid communication with the pressure sensing device;
    a plurality of secondary supply lines, each supply line of the plurality of secondary supply lines being in fluid communication with the manifold;
    a plurality of flow cells, each flow cell of the plurality of flow cells being in fluid communication with a respective one of the plurality of secondary supply lines and being configured to isolate one of a plurality of site isolated regions on a substrate from the others of the plurality of site isolated regions on the substrate; and
    a controller coupled to the pressure regulator and the pressure sensing device, wherein the controller is configured to receive the detected pressure of processing liquid flowing from the vessel through the first supply line from the pressure sensing device, compare the detected pressure to a predetermined pressure value, and regulate the pressure of pressurized gas provided from the pressurized gas source to the vessel using the pressure regulator based on the comparison.

2. The wet processing tool of claim 1, wherein each of the plurality of flow cells is configured to seal against a surface of the substrate.

3. The wet processing tool of claim 1, wherein the first supply line extends into the vessel, and wherein a line coupling the pressure regulator to the first vessel terminates at a top section of the first vessel.

4. The wet processing tool of claim 1, wherein the controller is further configured to vary a rate of fluid flow across the plurality of site isolated regions on the substrate.

5. The wet processing tool of claim 1, wherein the controller is configured such that regulating of the pressure of pressurized gas provided from the pressurized gas source to the vessel using the pressure regulator comprises decreasing the pressure of the pressurized gas provided from the pressurized gas source if the detected pressure is above a first threshold value and increasing the pressure of the pressurized gas provided from the pressurized gas source if the detected pressure is below a second threshold value.

6. The wet processing tool of claim 1, wherein the pressurized gas comprises nitrogen.

7. The wet processing tool of claim 1, further comprising a plurality of mixing vessels, wherein each of the plurality of mixing vessels is in fluid communication with a respective one of the plurality of secondary supply lines.

8. The wet processing tool of claim 7, wherein the supply manifold comprises a plurality of valves.

9. The wet processing tool of claim 3, wherein the first supply line extends through a top of the first vessel.

10. A wet processing tool configured to process multiple regions of a substrate combinatorially, comprising:
    a vessel configured to hold a semiconductor processing liquid;
    a pressurized gas source in fluid communication with the vessel;
    a pressure regulator in fluid communication with the vessel and the pressurized gas source, the pressure regulator configured to regulate a pressure of pressurized gas provided from the pressurized gas source to the vessel;
    a first supply line in fluid communication with the vessel;
    a pressure sensing device in fluid communication with the first supply line, wherein the pressure sensing device is configured to detect a pressure of processing liquid flowing from the vessel through the first supply line and generate a signal representative thereof;
    a supply manifold in fluid communication with the pressure sensing device;
    a plurality of secondary supply lines, each supply line of the plurality of secondary supply lines being in fluid communication with the manifold;
    a plurality of flow cells, each flow cell of the plurality of flow cells being in fluid communication with a respective one of the plurality of secondary supply lines and being configured to seal against a surface of a substrate and isolate one of a plurality of site isolated regions on the substrate from the others of the plurality of site isolated regions on the substrate; and a controller coupled to the pressure regulator and the pressure sensing device, wherein the controller is configured to receive the detected pressure of processing liquid flowing from the vessel through the first supply line from the pressure sensing device, compare the detected pressure to a first threshold value and a second threshold value, decrease the pressure of the pressurized gas provided from the pressurized gas source if the detected pressure is above the first threshold value, and increase the pressure of the pressurized gas provided from the pressurized gas source if the detected pressure is below the second threshold value.

11. The wet processing tool of claim 10, wherein the supply manifold comprises a plurality of valves.

12. The wet processing tool of claim 11, further comprising a plurality of mixing vessels, wherein each of the plurality of mixing vessels is in fluid communication with a respective one of the plurality of secondary supply lines.

\* \* \* \* \*